United States Patent [19]

Miyagawa

[11] 4,206,664
[45] Jun. 10, 1980

[54] PIPE CUTTING DEVICE

[75] Inventor: Fumiko Miyagawa, Osaka, Japan

[73] Assignee: Rex Industries Co., Ltd., Osaka, Japan

[21] Appl. No.: 934,275

[22] Filed: Aug. 16, 1978

[51] Int. Cl.² .............................................. B23B 3/22
[52] U.S. Cl. .................................................... 82/4 C
[58] Field of Search ........................................ 82/4 C

[56] References Cited

U.S. PATENT DOCUMENTS

| | | | |
|---|---|---|---|
| 1,115,277 | 10/1914 | Bodkin | 82/4 C |
| 2,699,604 | 1/1955 | Inqwer et al. | 82/4 C |
| 2,769,234 | 11/1956 | Young | 82/4 C |
| 3,650,514 | 3/1972 | Stunkard | 82/4 C |
| 3,807,047 | 4/1974 | Sherer et al. | 82/4 C |
| 4,130,034 | 12/1978 | Benoit | 82/4 C |

FOREIGN PATENT DOCUMENTS 445527  10/1974  U.S.S.R. ................................ 82/4 C

*Primary Examiner*—Harrison L. Hinson
*Attorney, Agent, or Firm*—Burgess, Ryan and Wayne

[57] ABSTRACT

A cutting device for pipes comprising an adjustable frame body defining a substantially equilateral polygon having a center opening through which a pipe to be cut extends, and a ring gear which is supported by the frame body and which carries at least one cutting tool radially projecting therefrom, such ring gear being capable of effecting a rotational movement for cutting the pipe.

8 Claims, 6 Drawing Figures

PIPE CUTTING DEVICE

This invention relates to a device for cutting a pipe or the like. The term "cutting" used hereinafter includes grooving, chamferring and the like.

A cutting device of this invention can be in particular, advantageously used when it is impossible to rotate a pipe to be cut, such as a pipe having a large diameter or an undergound pipe, since the cutting device can be easily mounted onto such a pipe and easily operated to rotate a ring gear provided with cutting tools in order to cut the pipe.

The present invention will be discussed in detail with reference to the accompanying drawings, in which FIG. 1 is a perspective view of a cutting device according to the invention;

Figure 1:
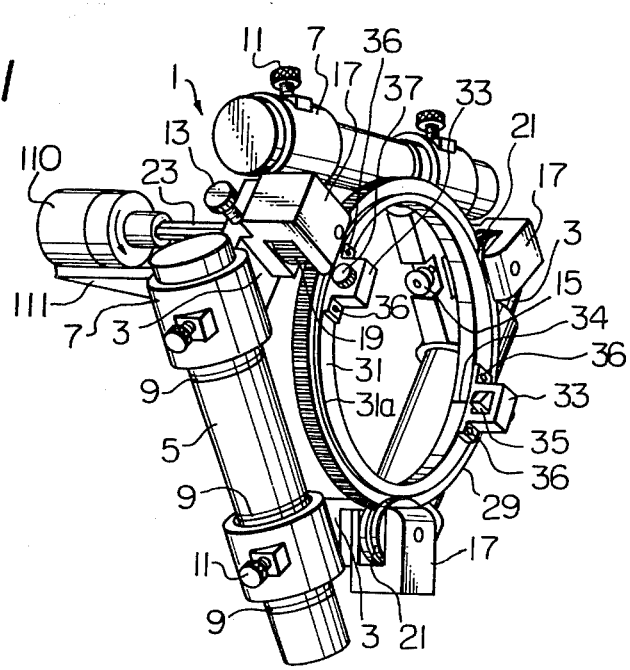

First, with reference to FIG. 1, the cutting device includes an adjustable ring frame body 1 which is composed of a plurality of identical rods 5 which have the same shape and length. In this embodiment of the invention, the rods 5 are three hollow round bars which are interconnected by means of connecting members 3 in such a way that the bars and their extensions define a substantially equilateral triangle. The number of the rods should preferably be three as shown in FIG. 1, but such number is not limited to three. The shape of the rods is also not limited to that of a round bar, and angle bars, for example, may be used in place thereof. Furthermore, the hollow rods which are preferable in view of the lightness of the entire device, can be replaced with solid ones. In summary, the most important point is that the rods, when extensions thereof are interconnected, define a substantially equilateral polygon.

The rods 5 are slidably connected to the connecting members 3. Each connecting member 3 is provided, at both of its ends, with guide rings or hollow cylinders 7 into which the rod 5 is fitted or telescopically inserted. The axes of the guide rings 7 of the adjacent two connecting members 3 intersect at an angle equal to a vertical angle of the equilateral polygon. At the ends of the rods 5 are preferably provided peripheral grooves 9 which have pitches corresponding to the standard diameters of a pipe (not shown in FIG. 1) which extends through a center opening of the frame body 1 to be cut, so that the rods 5 can be held in a desired position corresponding to a desired diameter of a pipe to be cut when set screws 11 are screwed in their corresponding threaded holes (not shown) formed in the guide rings 7 and when the front ends of the set screws 11 are engaged in any one of the peripheral grooves. The peripheral grooves 9 can be replaced by recesses (not shown) having shapes which are complemental to the front ends of the set screws 11. Thus, when the set screws 11 are loosened, the rods 5 are free to move from the connecting members 3 and to slide in the guide rings to increase or decrease the diameter of the frame body 1 in accordance with the diameter of the pipe to be cut. It will be noted that when the rods 5 are angle bars instead of round bars, the same operation as that mentioned above can be achieved due to the provision of guide rings having corresponding angle guide holes (not shown).

Each of the connecting members 3 is provided with a clamp 13 which clamps the outer periphery of the pipe to be cut and which is, for example, in the form of an adjusting screw having a front clamp jaw 15. Consequently, when the clamps 13 are fastened to clamp the pipe to be cut, the latter can be immovably held or clamped at least three points. Furthermore, the connecting members 3 are provided with U-shaped housing members 17. A pinion 19 connected to a rotation drive, such as a motor 110 which is supported by a bracket 111 secured to the connecting member 3, is rotatably supported in one of the housing members 17, and rollers 21 each having a substantially H-shaped section are rotatably supported in the other two housing members 7. A drive shaft 23 of the pinion 19 can be connected to the motor 110 to rotate therewith. Alternatively, it is also possible to manually rotate the drive shaft 23, for example, with the help of a detachable handle (not shown) or the like. Furthermore it is also possible to rotate the pinion 19 by means of a detachable portable electric drilling machine (not shown).

A ring gear 29 which has opposing stepped side faces 31 and outer peripheral teeth meshes with the pinion 19. The H-shaped rollers 21 bear against and roll onto the shoulder portions 31a of the stepped side faces 31. The ring gear 29 engaging with the pinion 19 is rotatably held in the peripheral grooves of the rollers 21 which define the U section. The bottoms of the peripheral grooves of the rollers 21 should preferably not touch the peripheral teeth of the ring gear 29 in order to prevent the peripheral teeth from breaking. If an increased drive power is necessary, all of or some of the rollers 21 may be replaced by pinions which are identical to the pinion 19 and which are also connected to motors such as the motor 110. When all of the rollers are replaced by the pinions 19, a peripherally uniform and increased drive power can be obtained. Alternatively, the rollers 21 can be replaced by driven gears or idlers. At least one tool holder 33 is mounted on one of the stepped side faces 31 of the ring gear 29. It is preferable that two tool holders 33 be diametrically arranged and that each of them supports a cutting tool 35. The cutting tool 35 can be, for example, a bit tool which can move radially. The radial movement of each tool 35 can be performed, for example, by a spring (not shown) precompressed by a screw 37 in the tool holder 33. That is, each tool 35, after being thrust onto the periphery of the pipe to be cut, is constantly and radially pressed against the periphery of the pipe by the compressed spring. It is also possible to intermittently move the tools in the radial directions at a predetermined pitch by means of conventional ratchet mechanisms. Thus, the tools 35 are progressively thrust into the pipe to be cut in accordance with the rotational movement of the ring gear 29 so as to cut the pipe.

The ring gear 29 should preferably consist of two identical halves which can be separated from each other and which can be rigidly interconnected by means of the holders 33 which are, in turn, secured to the two halves by means of screws 36. The two halves can also be interconnected by a separate connecting member or members (not shown) other than the tool holders 33. One separation line of the two halves is shown by reference numeral 34 in FIG. 1. Separating the two halves of the gear ring 29 ensures that the gear ring 29 can be attached onto the pipe to be cut, from radial directions, which is otherwise impossible. A radial attachment of the gear ring 29 is required to be carried out when it is impossible to attach the gear ring 29 axially onto the pipe to be cut, for example, when both ends of the pipe are placed in the gound or when a very long pipe is to be cut at its intermediate position located very far from the pipe ends.

It can be easily seen that it is not necessary for the ring gear to separate into two halves when the ring gear can be mounted onto the pipe to be cut in an axial direction from one end of the pipe. The separation of the ring gear is followed by a partial disassembly or separation of the frame body 1.

Figure 2:
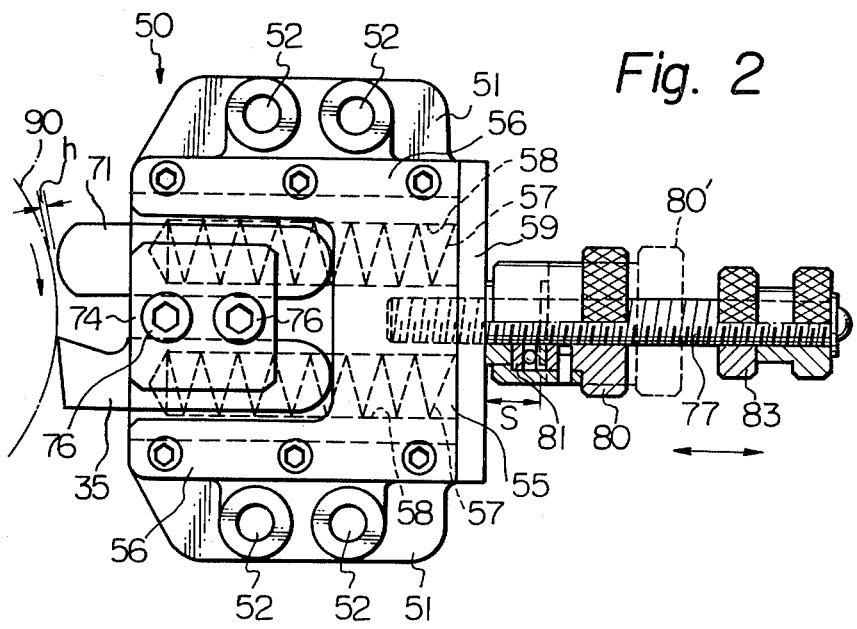
FIG. 2 is an enlarged elevational view of a modified tool holder.
Figure 3:
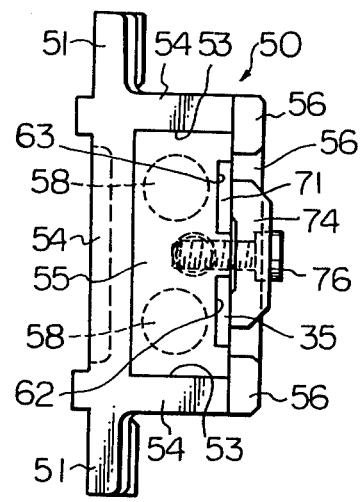
FIG. 3 is a left-hand side elevational view of FIG. 2.

FIGS. 2 and 3 show a practical and adaptable design of a tool holder which is designated by the reference numeral 50. The tool holder 50 corresponds to the tool holder 33 shown in FIG. 1 and includes flange portions 51 which are secured to the side face 31 of the ring gear 29 of FIG. 1 by means of screws or bolts (not shown) or the like passing through holes 52 formed in the flange portions 51. The tool holders 50 are usually attached to the ring gear 29 at a right angle with respect to the pipe 90 (FIG. 2) to be cut. Alternatively, the tool holders 50 may be attached to the ring gear 29 at a desired angle other than a right angle when the pipe 90 must be cut or chamferred at the desired angle.

The tool holder 50 includes in FIGS. 2 and 3 a substantially U-shaped body 54 positioned upright on one of its two side legs, as shown in FIG. 3. A slide support 55 having a corresponding rectangular shape is slidably fitted into a substantially rectangular channel 53 of the body 54. A substantially U-shaped top cover plate 56 positioned upright on one of its two legs is secured to the body 54 by means of, for example, screws (not shown) to partially cover the channel 53 in order to prevent the support 55 from rising upward out of the channel 53. The support 55 is provided therein with blind holes 58 in which springs 57 are arranged. Although two blind holes are provided in the illustrated embodiment, it is only necessary to provide a single center blind hole. The blind holes 58 are closed by a side cover plate 59 secured to the body 54. Compressed springs 57 are arranged in the respective blind holes 58 in such a way that the springs cause the support and, accordingly, the cutting tool 35 to effect a predetermined radial feed movement.

The support 55 is provided, on its upper surface, with U-shaped grooves 62 and 63 for receiving the cutting tool 35 and an abutment member 71 mentioned in detail below, respectively. The cutting tool 35 and the abutment member 71 can be detachably and immovably held in the respective grooves 62 and 63 by means of a cap plate 74 which is in turn secured to the support 55 by means of, for example, two tap bolts 76.

A screw rod 77 is screwed into the rear end of the support 55. The screw rod 77 is engaged with a nut member 80 so that, during rotation, the nut 80 can move in directions shown by the arrows in FIG. 2. A stop 83, which limits the outward movement of the nut 80, is secured to the outer end of the screw rod 77. Thus, when the nut 80 is rotated in the right hand direction of FIG. 2, i.e., in the outward direction, to an initial position 80' shown by dash lines, a gap S is produced between the end of the nut 80 and the outer side face of the side cover plate 59 due to the springs 57, thus resulting in the displacement of the screw rod 77 and, accordingly, in the displacement of the support 55 in the left hand direction of FIG. 2 by a distance corresponding to the gap S. Consequently, the cutting tool 35 and the abutment member 71 are moved in the left hand direction of FIG. 2.

As can be seen from the above description, when the cutting tools 35 are rotated on the periphery of the pipe 90 or when the pipe 90 itself rotated, the tools 35 can be thrust progressively into the pipe 90 by the rotation of the nut 80 to cut the pipe while the cutting edges of the tools 35 are pressed against the periphery of the pipe 90.

Alternatively, it is also possible to automatically feed the tools in the radial directions in order to thrust the cutting edges of the tools progressively into the pipe for cutting the pipe by initially pressing the cutting edges of the tools 35 against the periphery of the pipe 90 in such a way that there is provided a gap S, of a distance equal to and preferably slightly greater than the thickness of the pipe 90, located between the nut 80 and the side cover plate 59. In this way, when the value of the gap S is substantially equal to zero, that is, when the nut 80 substantially comes into contact with the side cover plate 59, the cutting, grooving or chamferring operation is completed. Upon completion of the operation, the tools 35 no longer move in the radial directions. In particular, during the grooving operation, the gap S provided when the cutting edges of the tools 35 are initially pressed against the pipe 90 is selected to have a value substantially equal to the value of a predetermined depth of a groove to be cut into the pipe 90.

Although it is preferable to provide abutment members 71 in the tool holders 50, it is not essential to provide such members for achieving the object of the invention. The abutment members 71 are adapted to maintain a constant depth of the penetration of the cutting edges of the tools 35 into the pipe 90. The abutment member 71 and the tool 35 in one tool holder 50 are placed in the same plane perpendicular to or inclined to the axis of the pipe 90. The length of the portion of the abutment member 71 that projects from the end face of the support 55 is slightly less than that of the portion of the tool 35 which projects from the end face of the support 55. That is, when the cutting edge of the tool 35 is initially brought into contact with the periphery of the pipe 90, the front edge of the abutment member 71 is slightly retracted or spaced from the pipe 90 at a predetermined length h. After completion of the thrust movement of the cutting edge of the tool 35 at the above-mentioned predetermined length, the front edge of the abutment member 71 begins to come into contact with the pipe 90 and is then thrust into the pipe 90 after contact is complete. Due to the existence of the retraction h of the abutment member 71, the amount of the thrust movement of the tool 35 into the pipe 90 at one time is maintained substantially at constant until the cutting operation is completed. That is, the abutment members 71 not only functions as a safety device which prevents an over-thrust of the tools 35 into the pipe 90 but also functions to maintain the cutting condition of the tools 35 at constant.

The numeral 81 designates a thrust bearing which enables the nut to easily rotate even when the spring force of the springs 57 is large.

Figure 4:
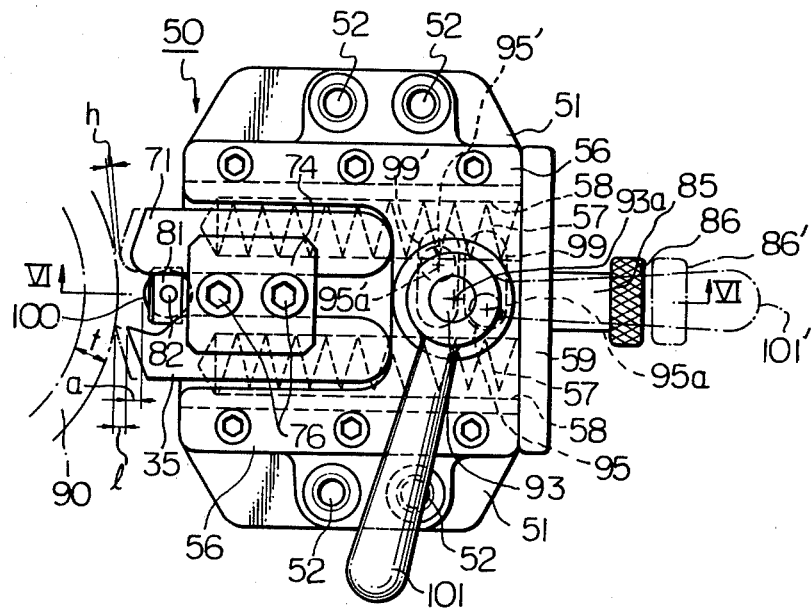
FIG. 4 is an elevational view of a further modification of a tool holder shown in FIG. 2.
Figure 5:
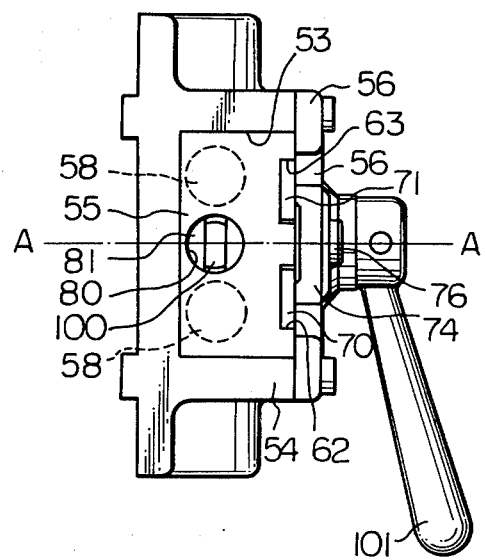
FIG. 5 is a left-hand side elevational view of FIG. 4.
Figure 6:
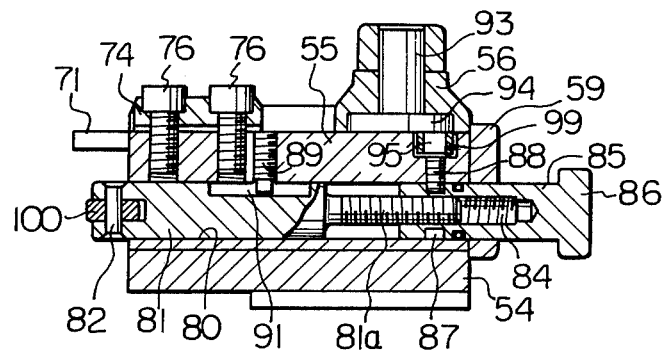
FIG. 6 is a sectional view taken along the line a—a in FIG. 5.

FIGS. 4 to 6 show a modification of a tool holder, in which elements or parts corresponding to those of FIGS. 2 and 3 are shown by the same numerals as those of the corresponding elements or parts of FIGS. 2 and 3.

The arrangement illustrated in FIGS. 4 to 6 is characterized by the provision of a guide roller 100 in the tool holder 50. The guide roller 100 is rotatably mounted onto a pin 82 secured to the front end of a slide rod 81 which is slidably inserted into a substantially central hole 80 formed in the support 55. The guide roller 100 is, as can be seen from FIG. 5, placed in a plane different from the plane in which the abutment member 71 and the tool 35 are arranged, in the direction of an axis A—A (FIG. 5) of the pipe 90 (FIG. 4). The slide rod 81 is provided, at its rear end, with a screw rod 81a which is screwed into a threaded center hole 84 of an adjusting rod 85. The outer end of the adjusting rod 85 is provided with a projecting knob 86 which can be rotated in a clockwise or counterclockwise direction for moving the slide rod 81 and, accordingly, the guide roller 100 in the radial directions of the pipe 90 (FIG. 4). The adjusting rod 85 is provided, on its outer periphery, with a peripheral groove 87 in which is fitted a front end of a pin or a screw 88 secured to the support 55 to prevent the longitudinal movement of the adjusting rod 85. The slide rod 81 is provided, on its outer periphery, with an elongated recess 91 in to which the front end of a pin or a screw 89 secured to the support 55 is placed to prevent the rotational movement of the slide rod 81 while permitting the longitudinal movement of the slide rod 81 by a distance corresponding to the longitudinal width of the elongated recess 91. As a result, the slide rod 81 can move in the longitudinal directions thereof when the screw rod 85 is rotated.

The arrangement shown in FIGS. 4 to 6 is also characterized by the provision of an eccentric cam mechanism described below. This eccentric cam mechanism is provided, in place of the assembly of the screw rod 77 and the nut 80 in the embodiment shown in FIGS. 2 and 3, in order to move the tools 35 in the radial directions of the pipe 90. It should be noted that it is not necessary to provide both the guide roller 100 and the eccentric cam mechanism together in the tool holder. The eccentric cam mechanism is provided on the top cover plate 56 for compressing the springs 57. The eccentric cam mechanism includes a rotation shaft 93 having a handle lever 101(FIG. 4), a rotation disc 94 secured to the rotation shaft 93, and a projection cam 95 which is eccentrically mounted to the bottom of the rotation disc 94, which elements can all be integrally formed together. The support 55 is provided with a cam follower in the form of an elongated slot 99 which is engaged with the projection cam 95, so that the rotational movement of the handle lever 101 can cause the support 55 to slide in the radial directions of the pipe 90 with respect to the stationary cover plate 56 due to the eccentric cam action provided by the engagement of the cam 95 with the elongated slot 99.

In order to bring the tool 35 into a working position, the hand lever is first manually brought into an initial or locked position at a location corresponding to the reference numeral 101 shown by a solid line in FIG. 4, in which position the support 55 is retracted and pressed against the cover plate 59 and the springs 57 are most compressed. In this locked position, the cutting edge of the tool 35 is not yet in contact with the pipe 90, thus providing a gap l therebetween, and the cam 95 is positioned at a location corresponding to the reference numeral 95. It should be noted that since the center line 95a of the cam 95 is situated below the center line 93a of the rotation shaft 93 in FIG. 4, even if the manual force exerting on the hand lever 101 is released the support 55 is still held in the above-mentioned locked position. That is, the support 55 cannot be moved toward the pipe by the force of the springs 57. From the locked position, the hand lever 101 is rotated in the counterclockwise direction of FIG. 4 to a working position corresponding to the reference numeral 101' shown by dashdot lines in which the cam 95 is accordingly moved to a position corresponding to the reference numeral 95'. (The elongated slot 99 is also displaced to a position corresponding to the reference numeral 99'.) The cutting edge of the tools 35 is brought into contact with the pipe 90 in the working position. That is, the support 55 is moved to a position in which the cutting edge of the tool comes into contact with the pipe, by a distance corresponding to the eccentricity of the cam 95. The positions corresponding to reference numerals 101' and 95' are shown only as one example and can be varied depending upon the initial gap l located between the cutting edge of the tool 35 and the pipe 90. In the working position the center line 95a' of the cam 95' is therefore, located above the center line 93a of the rotation shaft 93. Accordingly, the support 55 is biased toward the pipe 90, that is, the tool 35 is constantly pressed against the pipe by the spring 57. As a result, the cutting edge of the tool 35 is thrust progressively into the rotating pipe 90 for cutting the pipe. The above discussion can also apply to the case where the cutting device is rotated in place of the rotation of the pipe 90.

The arrangement of the guide roller 100 is adjusted by the adjusting knob 86 in such a way that the distance a between the cutting edge of the tool 35 and the roller 100 is substantially equal to or is slightly greater than the thickness t of the pipe 90 in the case of the cutting operation, and the distance a is substantially, equal to or is slightly greater than the depth of the groove to be cut on the pipe 90 in the case of the grooving operation. Generally speaking, the distance a should be selected to correspond to a value which is substantially equal to the value of the amount of the cut-out pipe. Accordingly, due to the provision of the guide roller 100, a uniform cut of the pipe throughout the entire periphery thereof can be performed. The provision of the above-mentioned guide roller is very advantageous in view of the difficulty in centering the pipe with respect to the cutting device or in view of the difficulty in manufacturing pipe blanks with very high precision.

Alternatively, it is also possible to provide non-rotatable guide members in place of the rotatable guide rollders 100. In this case, the members would come into sliding contact with the periphery of the pipe 90.

Furthermore, it is also possible to omit the guide rollers 100 by forming an appropriate profile on the front end of the slide rod 81.

As in apparent from the above discussion, the present invention, provides a cutting device which can be easily mounted directly onto a pipe to be cut and the size of which can be adjusted in accordance with diameter of a pipe to be cut. Furthermore, according to the invention, the ring gear can be rotated by a small drive having a small power which can drive a smaller gear, i.e., a pinion.

Variations in the diameter of the pipe to be cut can be compensate to a certain degree by adjusting the length of the portion of the clamping jaws 15 which project from the connecting members 3 in the radial directions of the pipe. When a pipe has a diameter which is considerably larger or smaller than the diameter of the ring gear 29, the ring 29 can be replaced by a larger or smaller one depending on the diameter of the pipe. However, even in this latter case, replacement of components or elements other than the ring gear is usually unnecessary.

The ring gear may be a ring member without gear teeth when the pipe to be cut instead of the ring gear is rotated. In this case the pinion 19 is not required since it is not necessary to rotate the ring gear. Due to such selection of the distance a, the guide roller 100 can come into contact with the periphery of the pipe 90 at the exact moment of the completion of the cutting operation. The provision of the guide roller 100 ensures the cutting of the pipe by the tools even when the roundness of the pipe 90 is not so complete, since the roller 100 will roll on the periphery of the pipe 90 as long as the thickness t of the pipe 90 is substantially uniform. Otherwise, if no guide roller is provided, when the pipe is not completely round or when the centering of the pipe is not accurate, the following undersirable condition will occur. That is, when one of the tools 35 has completed the cutting operation and the cutting edge of one tool has completely penetrated the pipe 90 having the thickness t, the other tool 35 will then be in a condition wherein it has not yet completed the cutting operation, and accordingly, the cutting edge of the other tool 35 will still be located in the pipe 90.

What is claimed is:

1. A device for cutting a pipe comprising: an adjustable ring frame body comprising a plurality of identical rods relatively movably interconnected by means of connecting members, said rods and their extensions defining a substantially equilateral polygon, having a center opening through which a pipe to be cut extends, a ring member comprising a ring gear having outer peripheral teeth, said frame body having means for rotatably supporting and guiding said ring gear means engaged with said ring gear and connecting to a drive for rotating said gear means to transmit the rotational movement to said ring gear, said ring member carrying at least one tool holder holding at least one cutting tool radially projecting therefrom, said frame body being provided with a plurality of adjustable clamp means for clamping said pipe.

2. A device as set forth in claim 1, wherein said adjustable ring frame body comprises three identical rods relatively movably interconnected by means of three connecting members, said rods and their extensions defining a substantially equilateral traiangle.

3. A device as set forth in claim 2, wherein each of said connecting member is provided, at both ends, with guide rings into which said rods are telescopically inserted and fixed in desired positions.

4. A device as set forth in claim 3, wherein said connecting members comprise clamp means having clamping jaws which adjustably project from said connecting members in radial directions of the pipe to be cut.

5. A device as set forth in claim 1, wherein each of said connecting members is provided, at both ends, with guide rings into which said rods are telescopically inserted and fixed in desired positions.

6. A device as set forth in claim 5, wherein said connecting members comprise clamp means having clamping jaws which adjustably project from said connecting members in radial directions of the pipe to be cut.

7. A device as set forth in claim 1, 2, 5, 3, 6 or 4, wherein said ring gear has opposing stepped side faces each having a peripheral shoulder, said means for rotatably supporting and guiding said ring gear comprising rollers each having a profile so as to rotatably hold said opposing stepped side faces and to roll on said shoulder.

8. A device as set forth in claim 7, wherein said cutting tool is adjustably held by said tool holder mounted onto one of said stepped side faces of said ring gear.

* * * * *

UNITED STATES PATENT OFFICE
CERTIFICATE OF CORRECTION

Patent No. 4,206,664            Dated  June 10, 1980

Inventor(s)  Fumiko Miyagawa

It is certified that error appears in the above-identified patent and that said Letters Patent are hereby corrected as shown below:

Column 1, line 10:  "undergound" should be --underground--.

Column 3, line 7:  "gound" should be --ground--.

Column 6, line 49:  "rollders" should be --rollers--.

line 54:  "in" should be --is--.

Signed and Sealed this

Sixth Day of January 1981

[SEAL]

Attest:

SIDNEY A. DIAMOND

Attesting Officer

Commissioner of Patents and Trademarks